(12) United States Patent
Wu et al.

(10) Patent No.: US 10,359,597 B2
(45) Date of Patent: Jul. 23, 2019

(54) OPTICAL SYSTEM

(71) Applicant: TDK TAIWAN CORP., Yangmei Taoyuan (TW)

(72) Inventors: Fu-Yuan Wu, Yangmei Taoyuan (TW); Kuo-Chun Kao, Yangmei Taoyuan (TW); Sin-Jhong Song, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 14 days.

(21) Appl. No.: 15/645,046

(22) Filed: Jul. 10, 2017

(65) Prior Publication Data

US 2018/0059356 A1 Mar. 1, 2018

Related U.S. Application Data

(60) Provisional application No. 62/378,842, filed on Aug. 24, 2016.

(30) Foreign Application Priority Data

Jun. 28, 2017 (CN) .......................... 2017 1 0507249

(51) Int. Cl.
*G02B 7/02* (2006.01)
*G02B 7/04* (2006.01)
(Continued)

(52) U.S. Cl.
CPC ............... *G02B 7/021* (2013.01); *G02B 7/04* (2013.01); *G02B 15/14* (2013.01); *G03B 3/10* (2013.01);
(Continued)

(58) Field of Classification Search
CPC .......... G02B 7/001; G02B 7/02; G02B 7/021; G02B 7/023; G02B 7/04; G02B 7/08; G02B 7/09; G02B 15/14; G02B 27/646; G03B 3/10; G03B 13/36; G03B 5/00; G03B 5/02; G03B 19/14; G03B 19/22; G03B 29/00; G03B 37/00; G03B 2205/0007; G03B 2205/0015; G03B 2205/0069; H04N 5/23248; H04N 5/23287
(Continued)

(56) References Cited

U.S. PATENT DOCUMENTS 7,515,364 B2 * 4/2009 Takahashi ............... G02B 7/023
359/811
7,830,759 B2 * 11/2010 Horiguchi ............ G11B 7/0956
369/44.32
(Continued)

*Primary Examiner* — Loha Ben
(74) *Attorney, Agent, or Firm* — Muncy, Geissler, Olds & Lowe, P.C.

(57) ABSTRACT

An optical system is provided, including a base, a first lens driving module and a second lens driving module. The first lens driving module includes a first holder, a first magnet, and a first coil corresponding to the first magnet, wherein the first holder is used to hold a first optical element and has a first side. The second lens driving module includes a second holder, a second magnet, and a second coil corresponding to the second magnet, wherein the second holder is used to hold a second optical element and has a second side. The first side is adjacent and parallel to the second side, and no magnet is disposed on the first side or second side.

20 Claims, 18 Drawing Sheets

(51) Int. Cl.
  *G03B 3/10* (2006.01)
  *G03B 13/36* (2006.01)
  *G03B 19/14* (2006.01)
  *G03B 19/22* (2006.01)
  *G02B 15/14* (2006.01)

(52) U.S. Cl.
  CPC ............ *G03B 13/36* (2013.01); *G03B 19/14* (2013.01); *G03B 19/22* (2013.01); *G03B 2205/0007* (2013.01); *G03B 2205/0069* (2013.01)

(58) Field of Classification Search
  USPC ....... 359/813, 814, 823, 824, 694, 696–698; 396/73, 79, 80, 85, 87, 351, 99, 353
  See application file for complete search history.

(56) References Cited

U.S. PATENT DOCUMENTS

| | | | |
|---|---|---|---|
| 8,028,310 B2* | 9/2011 | Hayakawa | G11B 7/0933 369/112.23 |
| 9,958,756 B2* | 5/2018 | Hu | G02B 7/09 |
| 9,995,945 B2* | 6/2018 | Hu | G02B 27/646 |
| 2017/0336699 A1* | 11/2017 | Hu | G02B 7/09 |
| 2018/0100983 A1* | 4/2018 | Kao | G02B 7/021 |
| 2018/0100984 A1* | 4/2018 | Wu | G02B 7/023 |
| 2018/0210317 A1* | 7/2018 | Hu | G02B 7/08 |

* cited by examiner

OPTICAL SYSTEM

CROSS-REFERENCE TO RELATED APPLICATIONS

The present application claims priority to U.S. Provisional Patent Application No. 62/378,842, filed on Aug. 24, 2016, and China Patent Application No. 201710507249.5 filed on Jun. 28, 2017, which is incorporated by reference herein in its entirety.

BACKGROUND OF THE INVENTION

Field of the Invention

The invention relates to an optical system, such as a duel-lens camera system, and more particularly to a dual-lens camera system that can move lenses using an electromagnetic force.

Description of the Related Art

In existing dual-lens camera systems, two lens driving modules are usually arranged close to each other, and as a result, magnetic interference between the magnets of the two lens driving modules is likely to occur, causing the focus speed and accuracy of the lenses (which can move with the movement of the movable parts in the lens driving modules) to be adversely affected. Therefore, what is needed is a dual-lens camera system that can prevent magnetic interference between the two lens driving modules.

BRIEF SUMMARY OF THE INVENTION

In view of the aforementioned problems, an object of the invention is to provide a dual-lens camera system that can reduce the magnetic interference generated by the magnetic elements of the two lens driving modules, thereby improving the focus speed and accuracy of the lenses in the dual-lens camera system.

An embodiment of the invention provides a dual-lens camera system, including a base, a first lens driving module and a second lens driving module. The first lens driving module includes a first holder, a first magnet, and a first coil corresponding to the first magnet, wherein the first holder is used to hold a first optical element and has a first side. A magnetic force is generated between the first coil and the first magnet to move the first holder and the first optical element relative to the base. The second lens driving module includes a second holder, a second magnet, and a second coil corresponding to the second magnet, wherein the second holder is used to hold a second optical element and has a second side. A magnetic force is generated between the second coil and the second magnet to move the second holder and the second optical element relative to the base. The first side is adjacent and parallel to the second side, and no magnet is disposed on the first side or second side.

BRIEF DESCRIPTION OF THE DRAWINGS

In view of the aforementioned problems, an object of the invention is to provide a dual-lens camera system that can reduce the magnetic interference generated by the magnetic elements of the two lens driving modules, thereby improving the focus speed and accuracy of the lenses in the dual-lens camera system.

DETAILED DESCRIPTION OF THE INVENTION

The making and using of the embodiments of a dual-lens camera system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
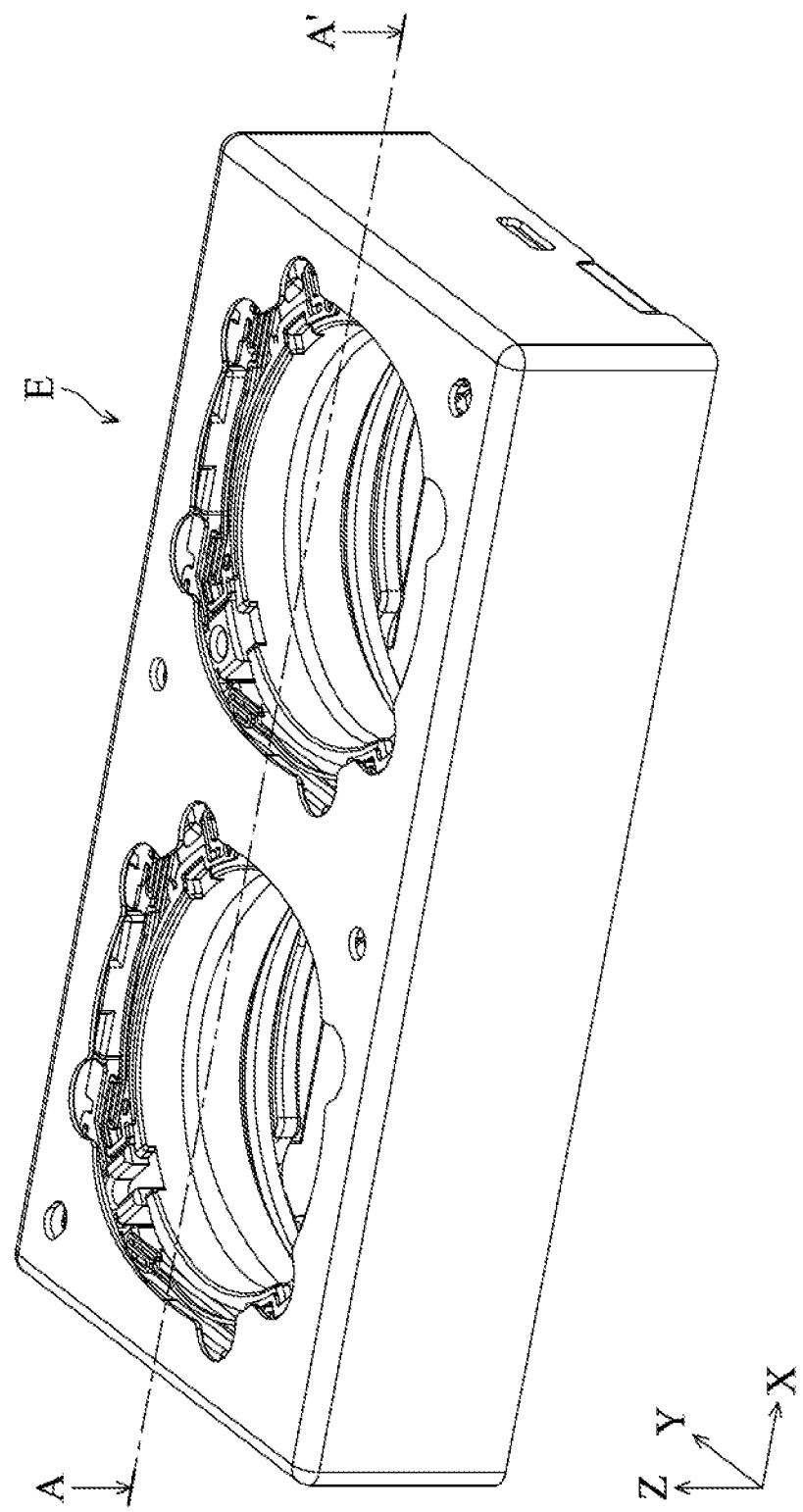
FIG. 1 is a schematic view of an optical system in accordance with an embodiment of the invention.
Figure 2:
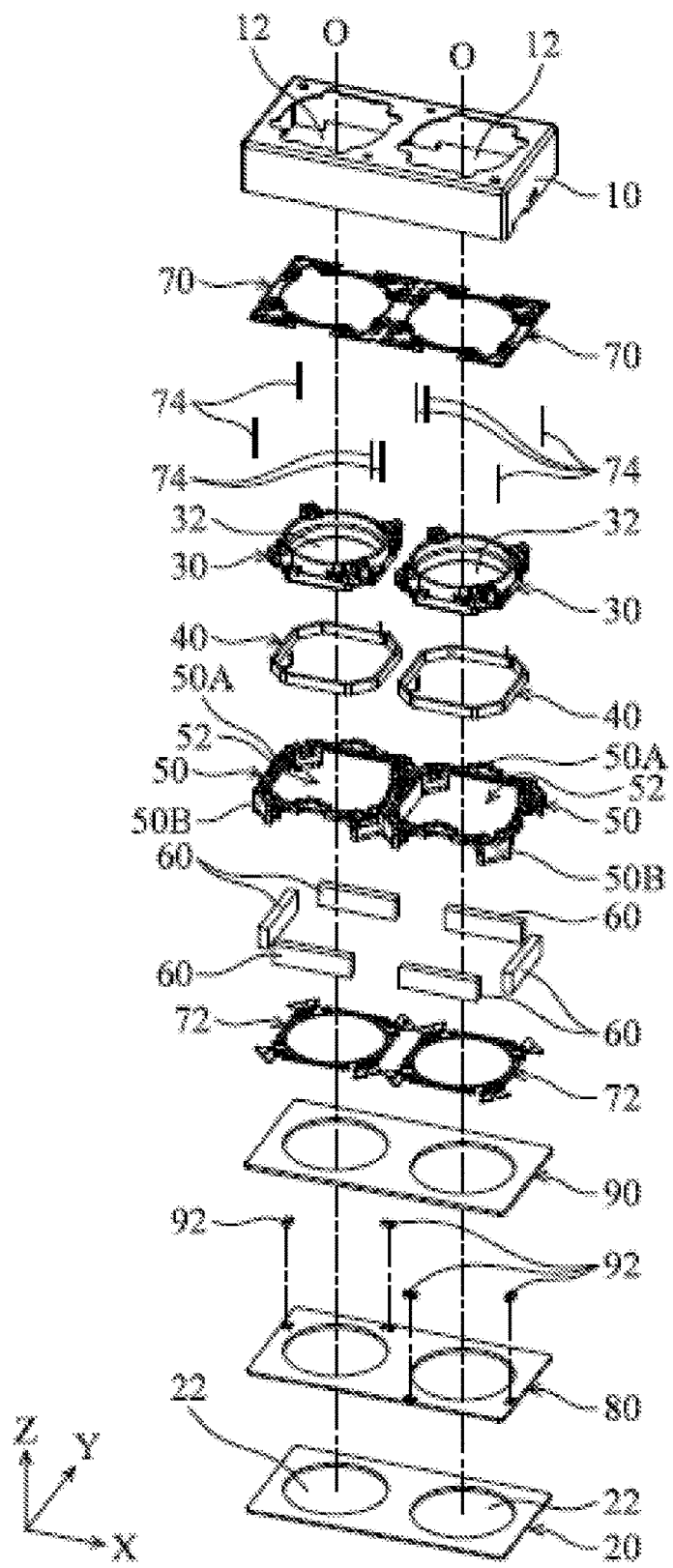
FIG. 2 is an exploded view of the optical system in FIG. 1.
Figure 3:
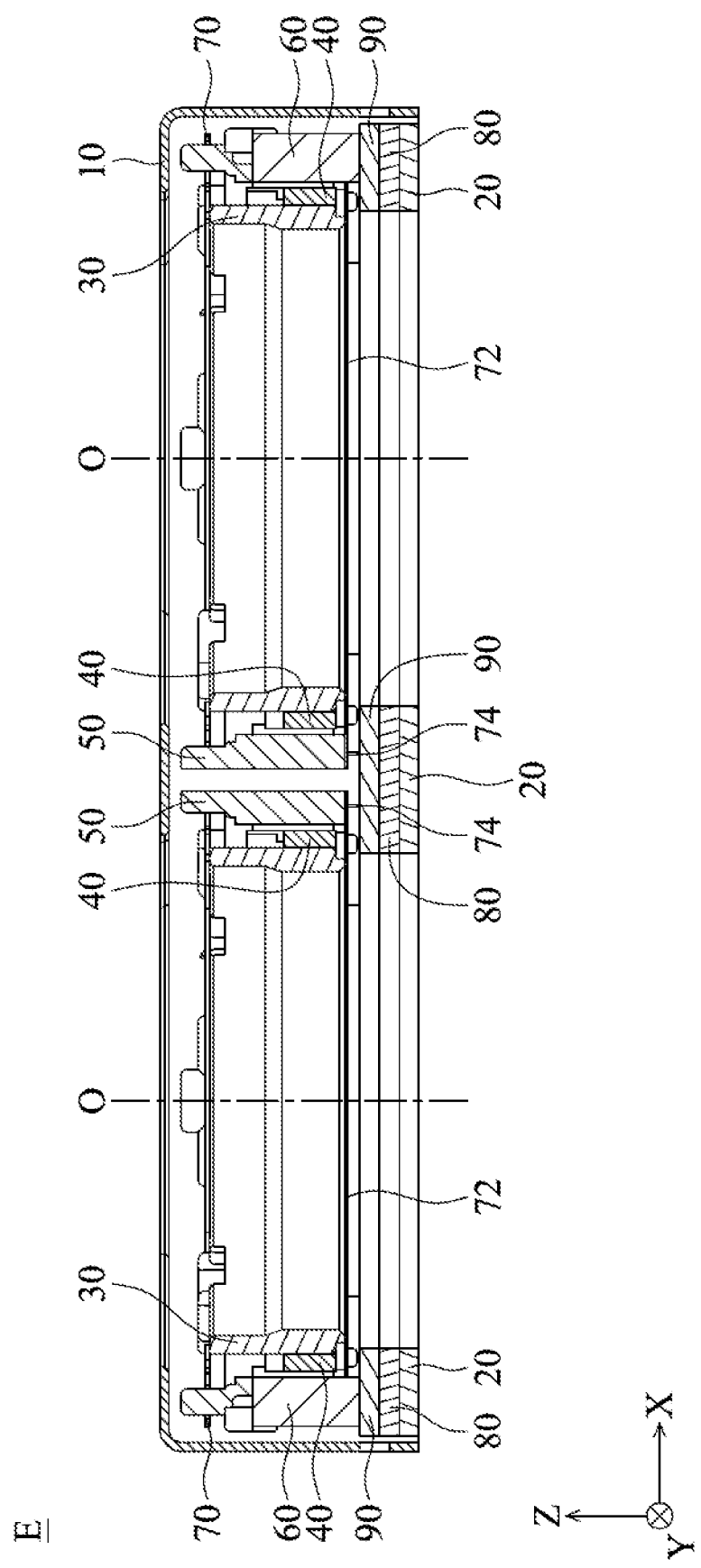
FIG. 3 is a cross-sectional view taken along line A-A' in FIG. 1.

Referring to FIGS. 1 to 3, wherein FIG. 1 is a schematic view of an optical system E in accordance with an embodiment of the invention, FIG. 2 is an exploded view of the optical system E in FIG. 1, and FIG. 3 is a cross-sectional view taken along line A-A' in FIG. 1. In this embodiment, the optical system E may be a dual-lens camera system including two symmetrical lens driving modules for receiving an optical element (not shown). The two lens driving modules may be provided in handheld digital products such as mobile phones or tablet PCs and arranged side-by-side in a long-axis direction (the X-axis direction). The two lens driving modules may be, for example, voice coil motors (VCM) having the same specification and equipped with an optical image stabilizer (OIS) function, and they may also have different specifications and be equipped with auto-focus (AF) and OIS functions.

As shown in FIGS. 1 to 3, the two lens driving modules in this embodiment include a shared top casing 10, a shared base 20, a pair of holders 30, a pair of driving coils 40, a pair of frames 50, a plurality of driving magnets 60, a pair of upper springs 70, a pair of lower springs 72, two pairs of suspension wires 74, a shared circuit board 80, a shared driving board 90, and a plurality of magnetic field sensing elements 92. In the present embodiment, the shape of each lens driving module is substantially square or rectangular.

The top casing 10 can be combined with the base 20 to form a housing of the lens driving module. In addition, a top casing opening 12 and a base opening 22 are respectively formed on the top casing 10 and the base 20. The center of the top casing opening 12 is located on an optical axis O (parallel to the Z-axis) of a lens (not shown). The base opening 22 is also located on the optical axis O and faces an image sensor (not shown) placed outside the lens driving module. Accordingly, the lens in the lens driving module 2 and the image sensor can perform image focusing in the direction of the optical axis O.

The holder 30 has a through hole 32, wherein the optical element can be locked in the through hole 32. The coil 40 is wound around the outer surface of the holder 30.

The frame 50 has an opening 52, four frame edges 50A and four frame corners 50B, wherein the driving magnets 60 are affixed to the frame 50. In this embodiment, the driving magnets 60 are affixed to three of the frame edges 50A of the frame 50. In some embodiments, the driving magnets may also be affixed to the edge corners 50B of the frame 50. It should be understood that the coil 40 may be replaced by a plurality of capsule-shaped driving coils (not shown), wherein the plurality of capsule-shaped driving coils may be disposed on different sides of the holder 30 and correspond to the driving magnets 60. A magnetic force may be generated by the interaction between the driving magnets 60 and the coil 40 (or the capsule-shaped driving coils) to move the holder 30 relative to the frame 50 along the Z-direction, thereby achieving fast focusing.

In this embodiment, the holder 30 and the lens therein are movably disposed in the frame 50. More specifically, the holder 30 is suspended in the frame 50 by the upper spring 70 and the lower spring 72 made of a metal material (FIG. 3). When a current is supplied to the coil 40, the coil 40 can act with the magnetic field of the driving magnets 60 to generate an electromagnetic force to move the holder 30 and the lens therein along the optical axis O direction with respect to the frame 50 to achieve auto focusing. For example, the driving magnets 60 (magnetic elements) may comprise at least one multipole magnet which is used to electromagnetically act with the coil 40 to move the holder 30 and the lens along the optical axis O so as to perform image focusing.

The circuit board 80, such as a flexible printed circuit board (FPC), is affixed to the base 20 by adhesion, for example. In this embodiment, the circuit board 80 is electrically connected to a driving unit (not shown) placed outside the lens driving module to perform OIS and other functions (such as AF function).

One end of the four suspension wires 74 is affixed to the circuit board 80 and the other end is connected to the upper spring 70, so that the suspension wire 74 can suspend the frame 50 and the lens holder 30 therein in the top casing 10. The suspension wires 74 may comprise a metal material.

The driving board 90, which may be a printed circuit board, has driving coils (not shown) therein, and is affixed to the circuit board 80 by adhesion. It should be realized that the circuit board 80 may transmit electrical signals to the driving board 90, and the circuit board 80 may also transmit electrical signals to the coil 40 through the suspension wires 74 and the upper springs 70, thereby controlling the movement of the holder 30 along the X-axis, Y-axis or Z-axis.

In this embodiment, two magnetic field sensing elements 92 are mounted on two respective sides of the base 20. The two magnetic field sensing elements 92 may be Hall effect sensors, MR sensors, or Fluxgate sensors, and can be used to learn the position offset amount of the frame 50 and the holder 30 with respect to the base 20 in the X-axis and Y-axis directions by detecting the magnetic field variation of the driving magnets 60 on the frame 50.

Furthermore, the circuit board 80 can generate electrical signals to be transmitted to the first driving coils of the driving board 90, and the coils in the driving board 90 (e.g. flat printed coils) can act with the driving magnets 60 on the frame 50 to generate an electromagnetic force to move the frame 50 and the holder 30 therein along a direction that is perpendicular to the optical axis O (parallel to the XY plane). As a result, the OIS function is achieved.

As shown in FIGS. 2 and 3, since the position of the two lens driving modules in the optical system E is very close, magnetic interference between the two adjacent driving magnets 60 of the two lens driving modules is likely to occur, causing the focus speed and accuracy of the lenses to be adversely affected. As a result, driving magnets 60 may be disposed on the different sides of the two holders 30, but not disposed on the adjacent sides of the two holders 30 in this embodiment. As a result, the magnetic interference between the two lens driving modules may be reduced.

Figure 4A:
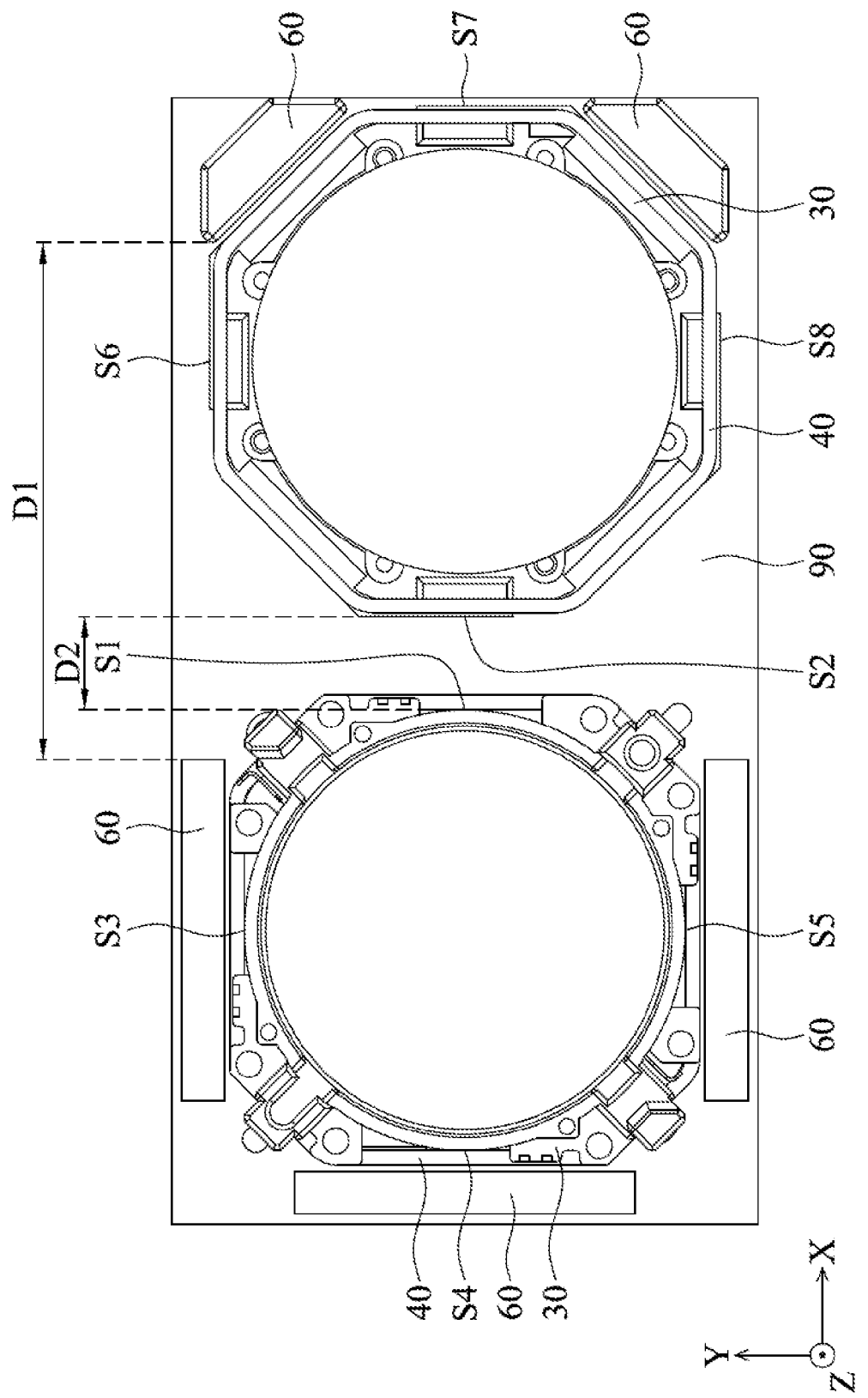
FIGS. 4A-4B are schematic views showing the configuration of the dual-lens camera system in accordance with an embodiment of the invention.
Figure 4B:
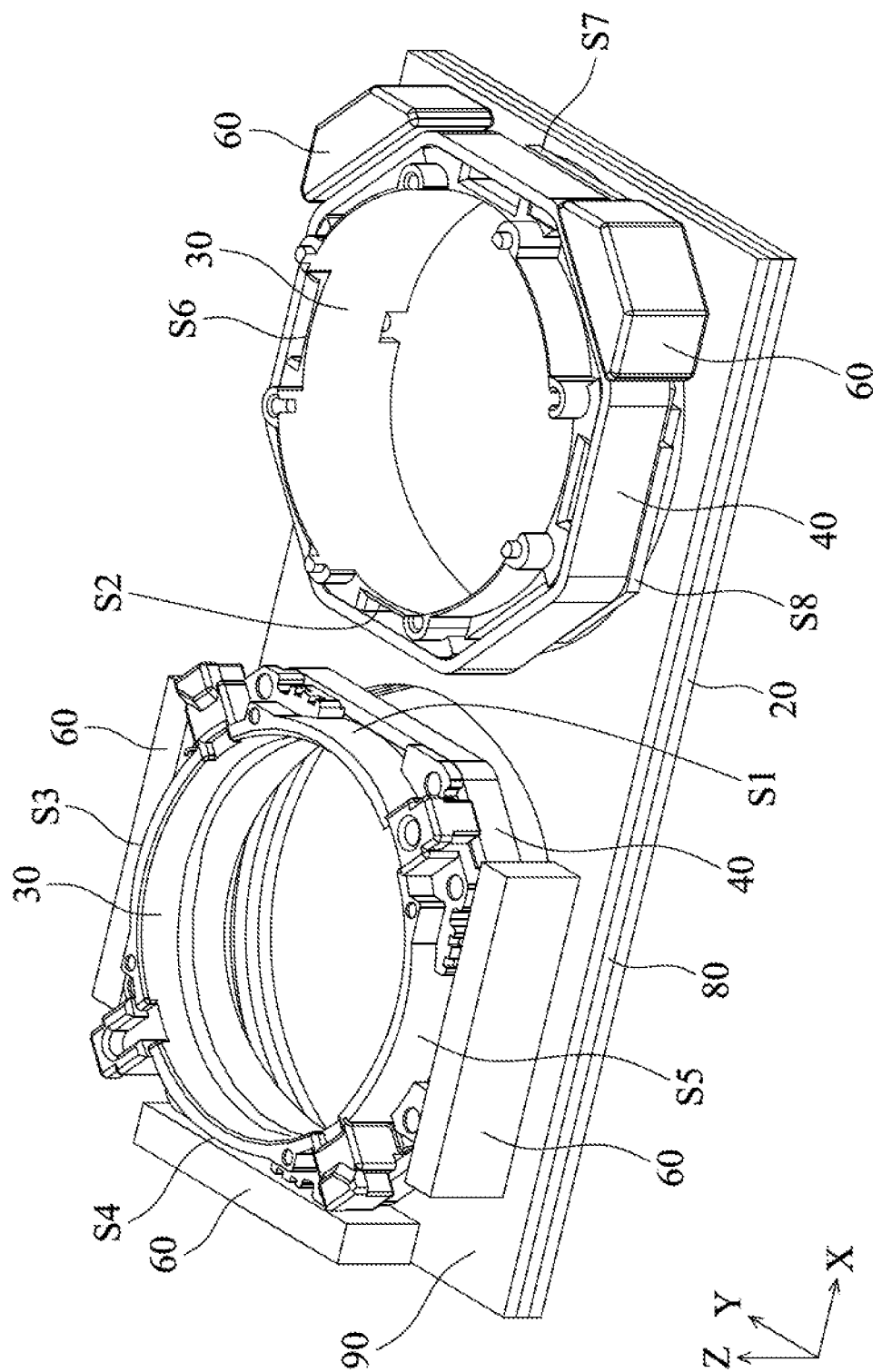

FIGS. 4A-4B are schematic views showing the configuration of the dual-lens camera system of the optical system in accordance with an embodiment of the invention. For better understanding, some elements identical as those in FIG. 2 are omitted in this embodiment, wherein the left and right parts of the optical system are distinguished as the first and second lens driving module, respectively. As shown in FIG. 4A, the holder 30 of the first lens driving module at the left (the first holder) has four sides S1, S3, S4 and S5, the holder 30 of the second lens driving module at the right (the second holder) has four sides S2, S6, S7 and S8, wherein sides S1 and S2 are the adjacent sides of the two holders 30. Sides S1, S2, S4 and S7 are parallel to each other and substantially extend along the X-axis, and sides S3, S5, S6 and S8 are parallel to each other and substantially extend along the Y-axis. The coil 40 is wound around and disposed on the outer surface of the holder 30.

As shown in FIG. 4A, in the duel-lens camera system, at least one driving magnet 60 is disposed on both the first and second lens driving modules, wherein the driving magnets 60 may be located on the sides S3-S8 of the two holders 30 or on the corners far from the sides S1 and S2. No magnet is disposed on the sides S1 or S2 of the holder 30. As a result, a first distance D1 between the two nearest driving magnets 60 in the first and second lens driving module will be greater than a second distance D2 between the sides S1 and S2 of the two holders 30. The magnetic interference between the driving magnets 60 of the two lens driving modules which are close to each other may be reduced, thereby ensuring the focus speed and accuracy of the lenses of the dual-lens camera system. In some embodiments, two coils (first and second coils) may be disposed in the driving board 90 and respectively correspond to the driving magnets 60 (the first and second magnets) of the two lens driving modules. By the magnetic driving force between the coils in the driving board 90 and the driving magnets 60 of the frame 50, the holder 30 and the frame 50 may be moved in a direction perpendicular to the optical axis X (parallel to the X-Y plane). As a result, the OIS function is achieved.

Figure 5A:
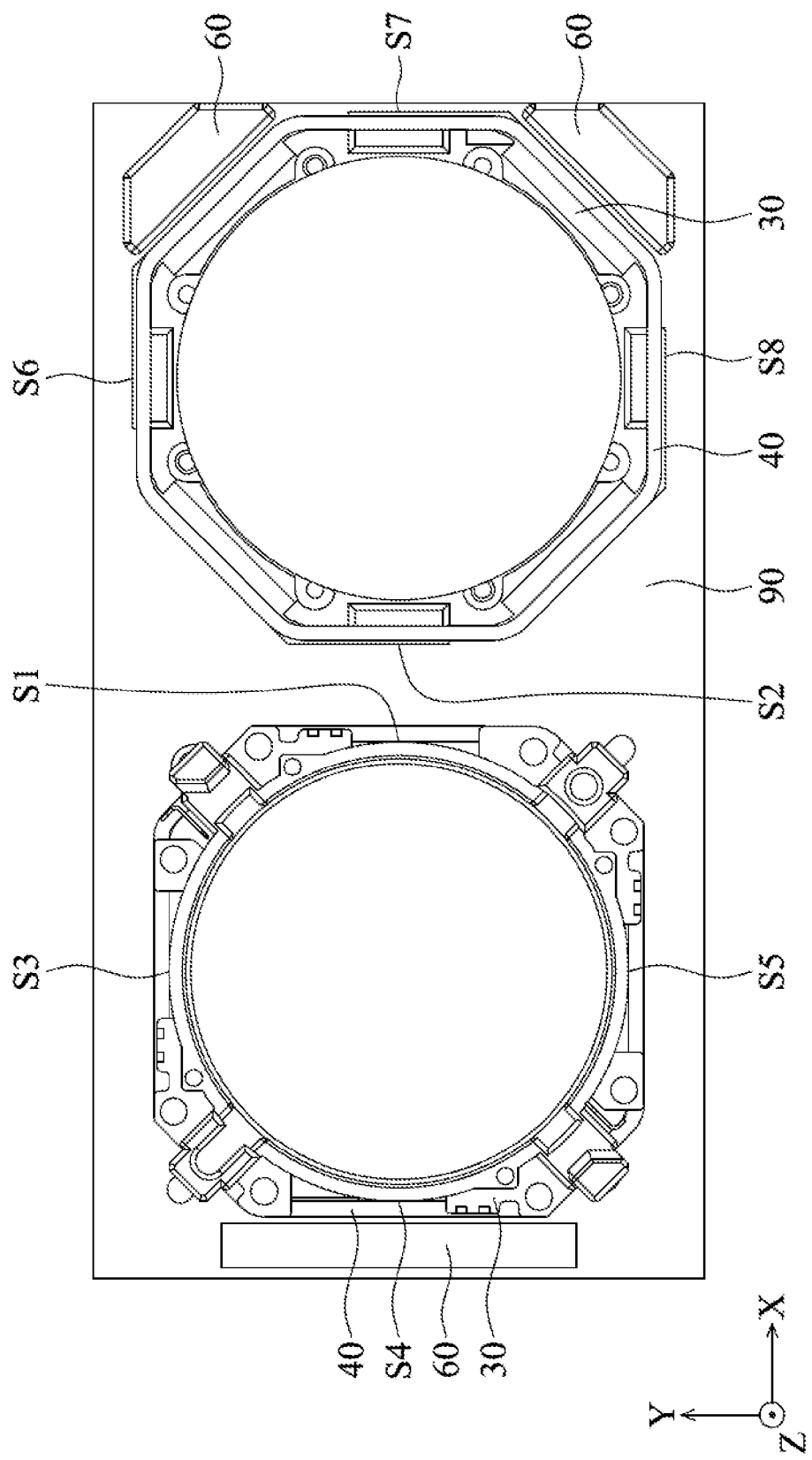
FIGS. 5A-5B are schematic views showing the configuration of the dual-lens camera system in accordance with another embodiment of the invention.
Figure 5B:
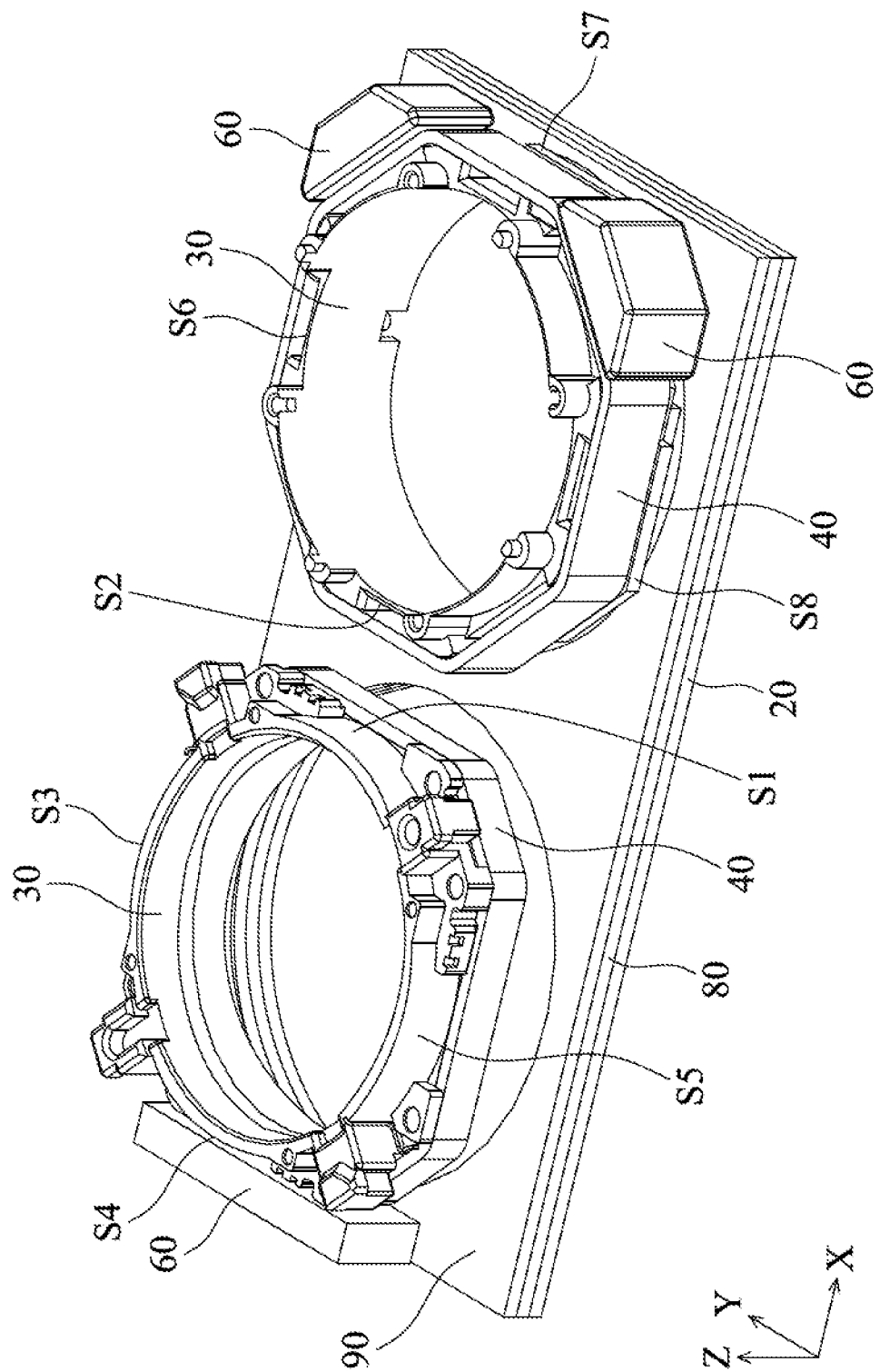

FIGS. 5A-5B are schematic views showing the configuration of the dual-lens camera system of the optical system in accordance with another embodiment of the invention. As shown in FIG. 5A, a driving magnet 60 is disposed on the side S4 of the holder 30 of the first lens driving module at the left (the first holder), and two driving magnets 60 are disposed on the corners of the second lens driving module which are far from the first lens driving module in this embodiment. The two driving magnets 60 disposed on the corners of the second lens driving module are substantially perpendicular.

With the above structural design shown in FIG. 5A, no magnet is disposed on the sides S1 and S2 of the holders 30 of the two lens driving modules, and the driving magnet 60 of the first lens driving module at the left is disposed on the location far from the second lens driving module at the right, the driving magnets 60 of the second lens driving module at the right are disposed on the location far from the first lens driving module at the left. As a result, the magnetic interference generated by the adjacent driving magnets 60 of the two lens driving modules can be reduced. Consequently, the magnetic interference between the two lens driving modules of the dual-lens camera system is reduced.

Figure 6A:
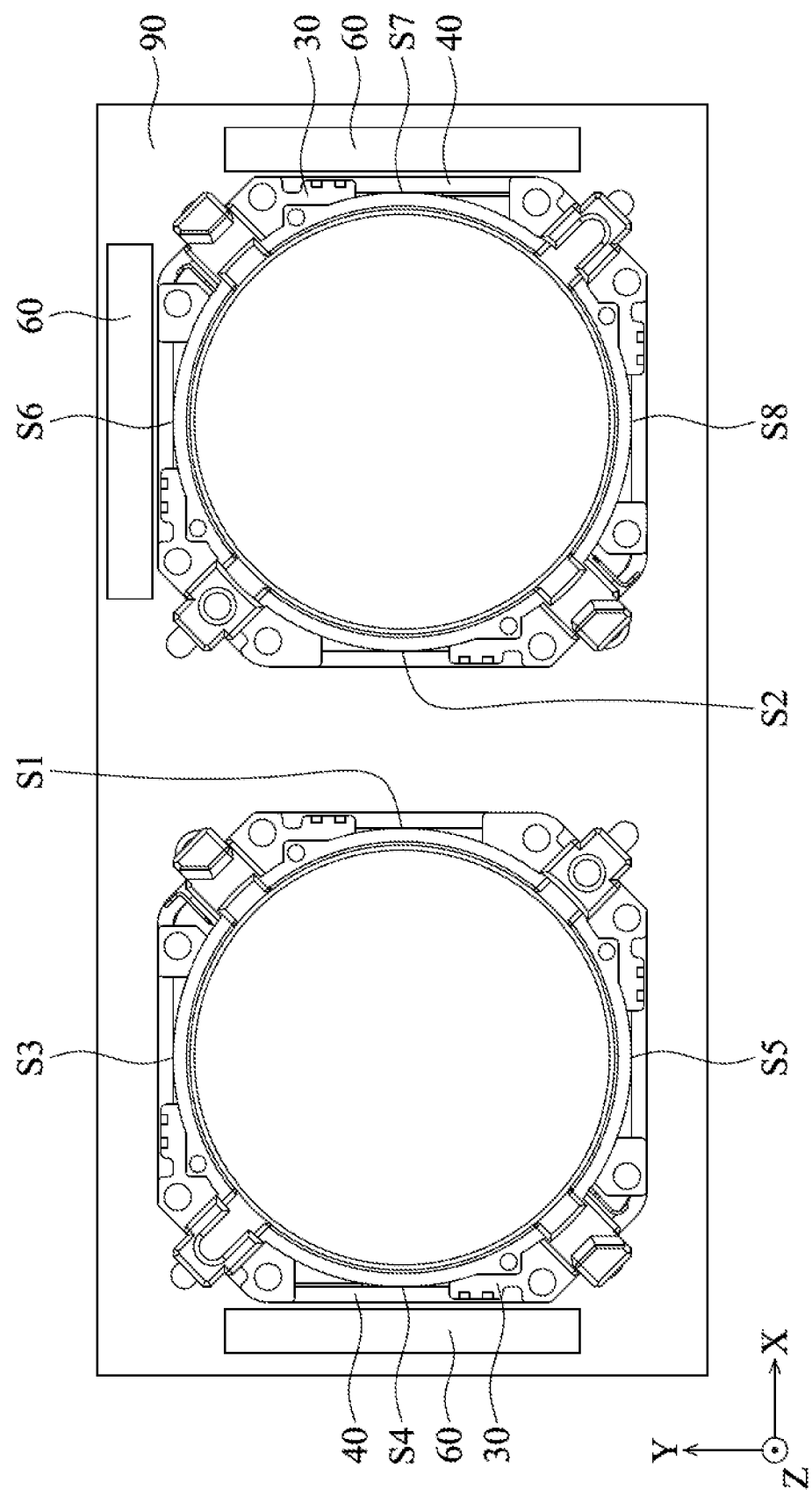
FIGS. 6A-6B are schematic views showing the configuration of the dual-lens camera system in accordance with another embodiment of the invention.
Figure 6B:
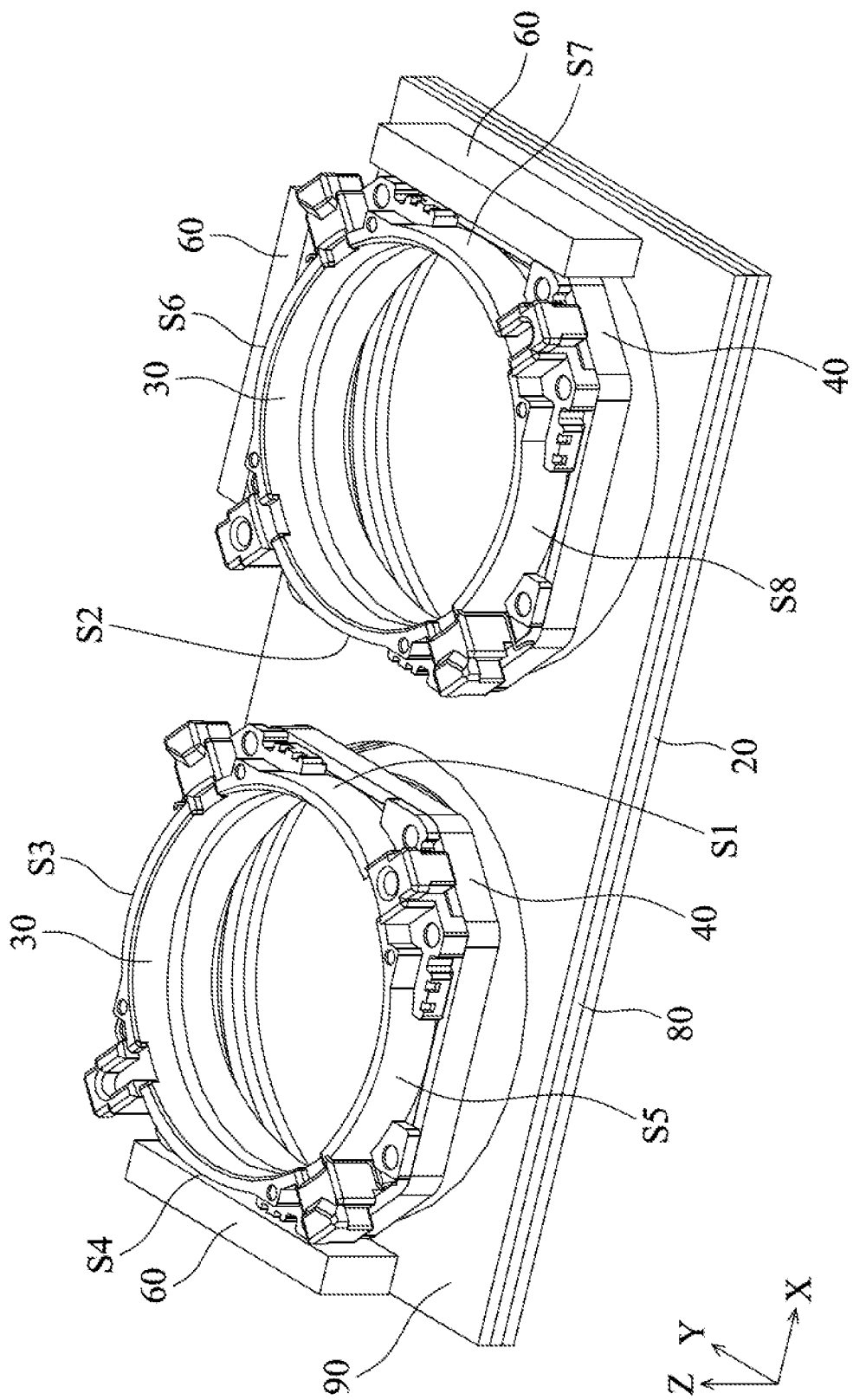

FIGS. 6A-6B are schematic views showing the configuration of the dual-lens camera system of the optical system in accordance with another embodiment of the invention. It should be noted that the configuration of the magnets in this embodiment is different from that in FIGS. 5A-5B, wherein three driving magnets 60 are respectively disposed on the side S4 of the holder 30 of the first lens driving module at the left (the first holder) and on the sides S6 and S7 of the holder 30 of the second lens driving module at the right (the second holder).

With the above structural design shown in FIG. 6A, no magnet is disposed on the sides S1 and S2 of the holders 30 of the two lens driving modules. As a result, the magnetic interference generated by the adjacent driving magnets 60 of the two lens driving modules can be reduced. Consequently, the magnetic interference between the two lens driving modules of the dual-lens camera system is reduced. Furthermore, no driving magnet 60 is disposed on the sides S5 and S8 of the two holders 30, so the width of the two lens driving modules along the Y-axis may be significantly reduced.

Figure 7A:
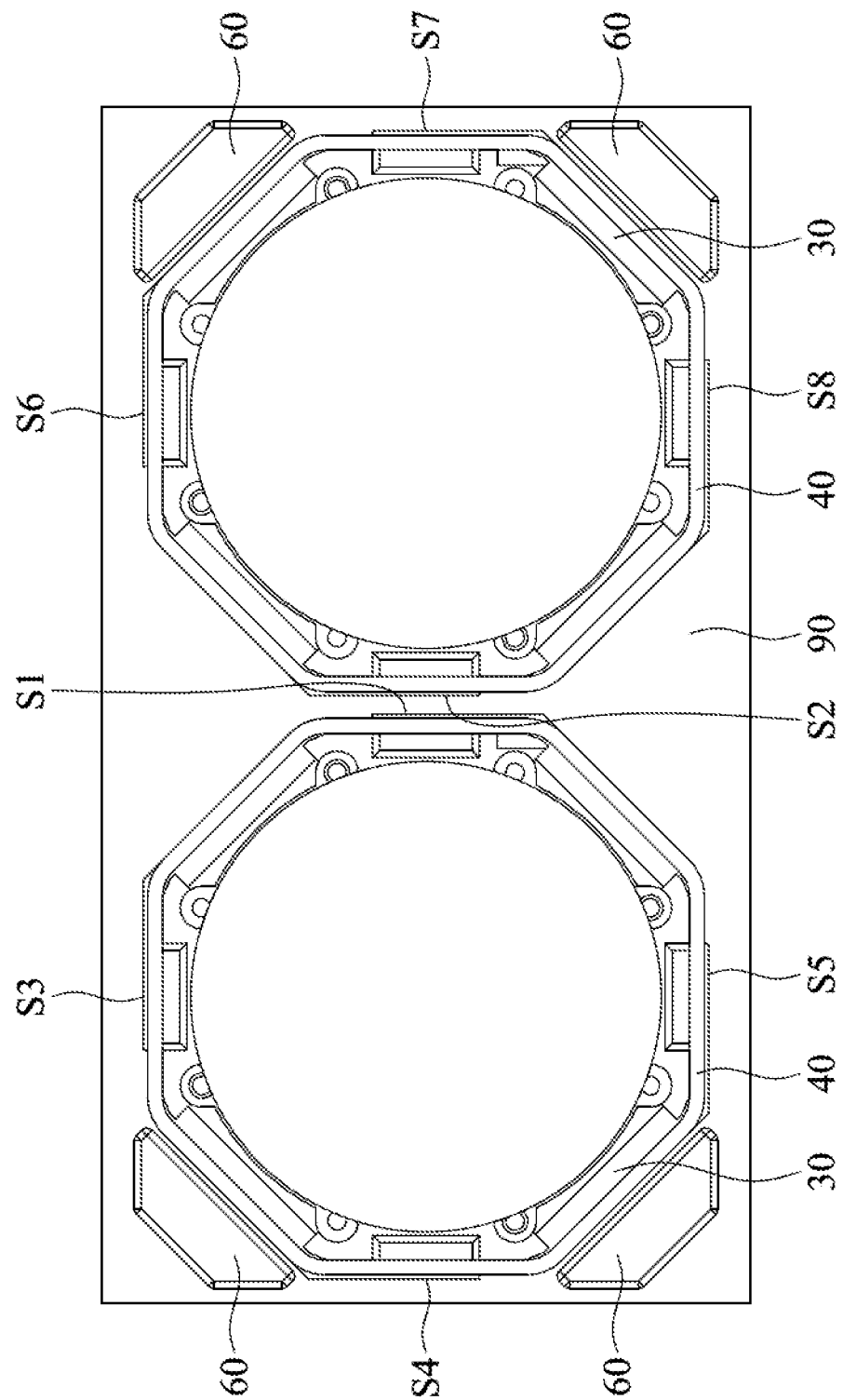
FIGS. 7A-7B are schematic views showing the configuration of the dual-lens camera system in accordance with another embodiment of the invention.
Figure 7B:
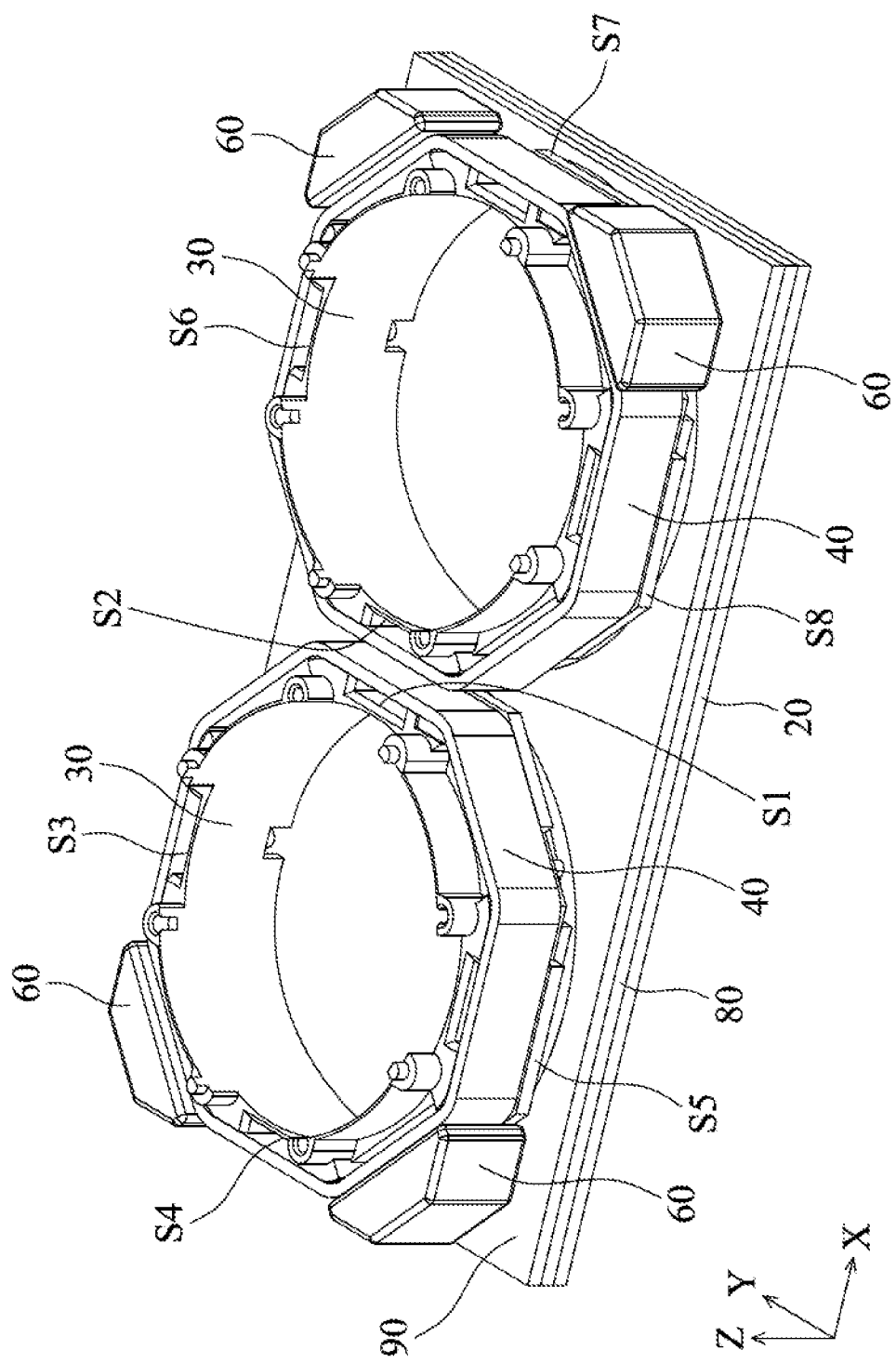

FIGS. 7A-7B are schematic views showing the configuration of the dual-lens camera system of the optical system in accordance with another embodiment of the invention. As shown in FIG. 7A, the driving magnets 60 are disposed on the two corners of the first lens driving module at the left which are far from the second lens driving module at the right, and on the two corners of the second lens driving module at the right which are far from the first lens driving module at the left. The two driving magnets 60 disposed on the first lens driving module are substantially perpendicular to each other, and the two driving magnets 60 disposed on the second lens driving module are substantially perpendicular to each other.

With the above structural design shown in FIG. 7A, the driving magnets 60 are disposed on the corners of the first and second lens driving module but not on the sides S1 and S2 of the adjacent holder 30. As a result, the magnetic interference generated by the adjacent driving magnets 60 of the two lens driving modules can be reduced. Consequently, the magnetic interference between the two lens driving modules of the dual-lens camera system is reduced. Furthermore, the space at the corner may be fully utilized by the driving magnets 60 disposed on the corner of the driving modules and thus the purpose of device miniaturization is achieved.

Figure 8A:
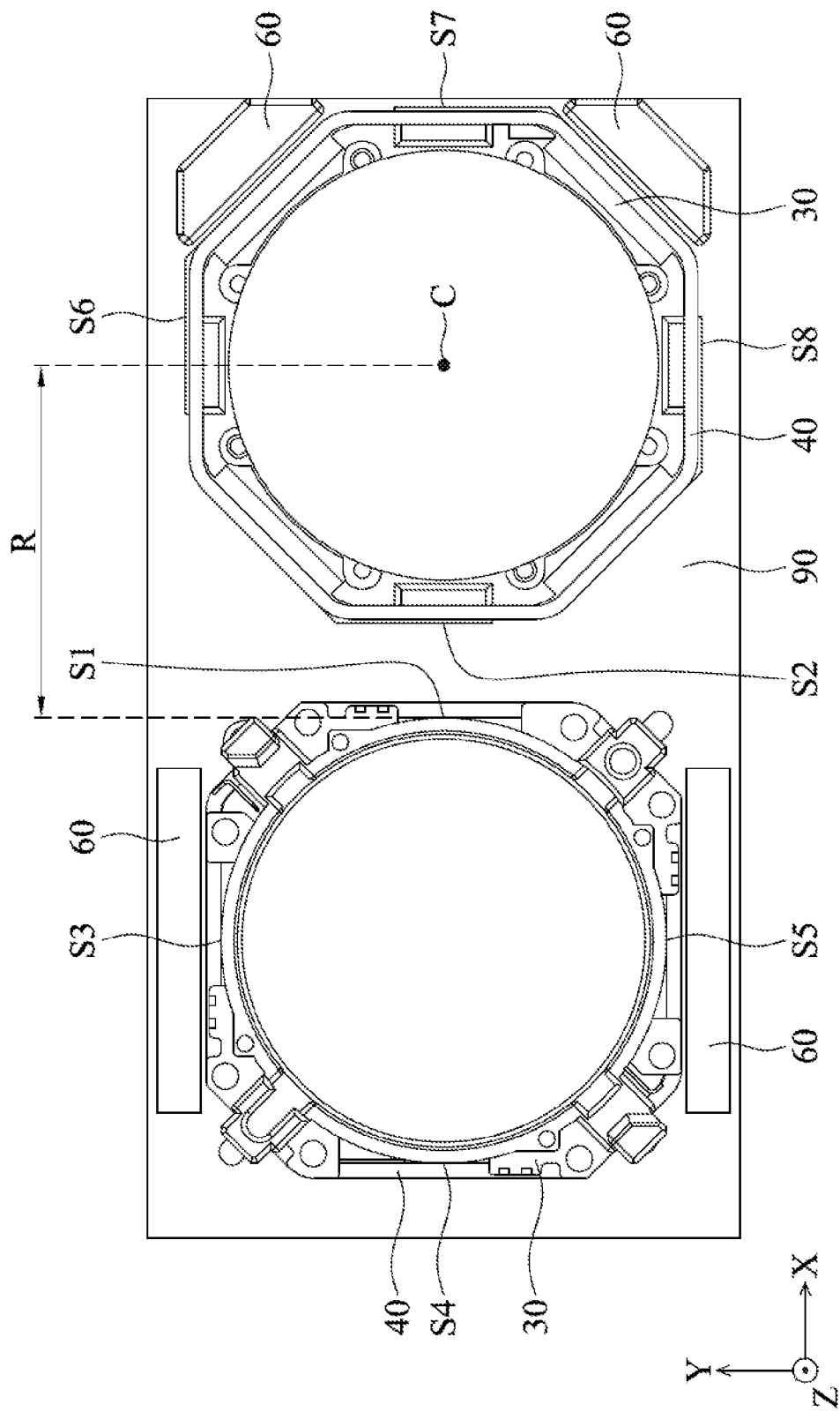
FIGS. 8A-8B are schematic views showing the configuration of the dual-lens camera system in accordance with another embodiment of the invention.
Figure 8B:
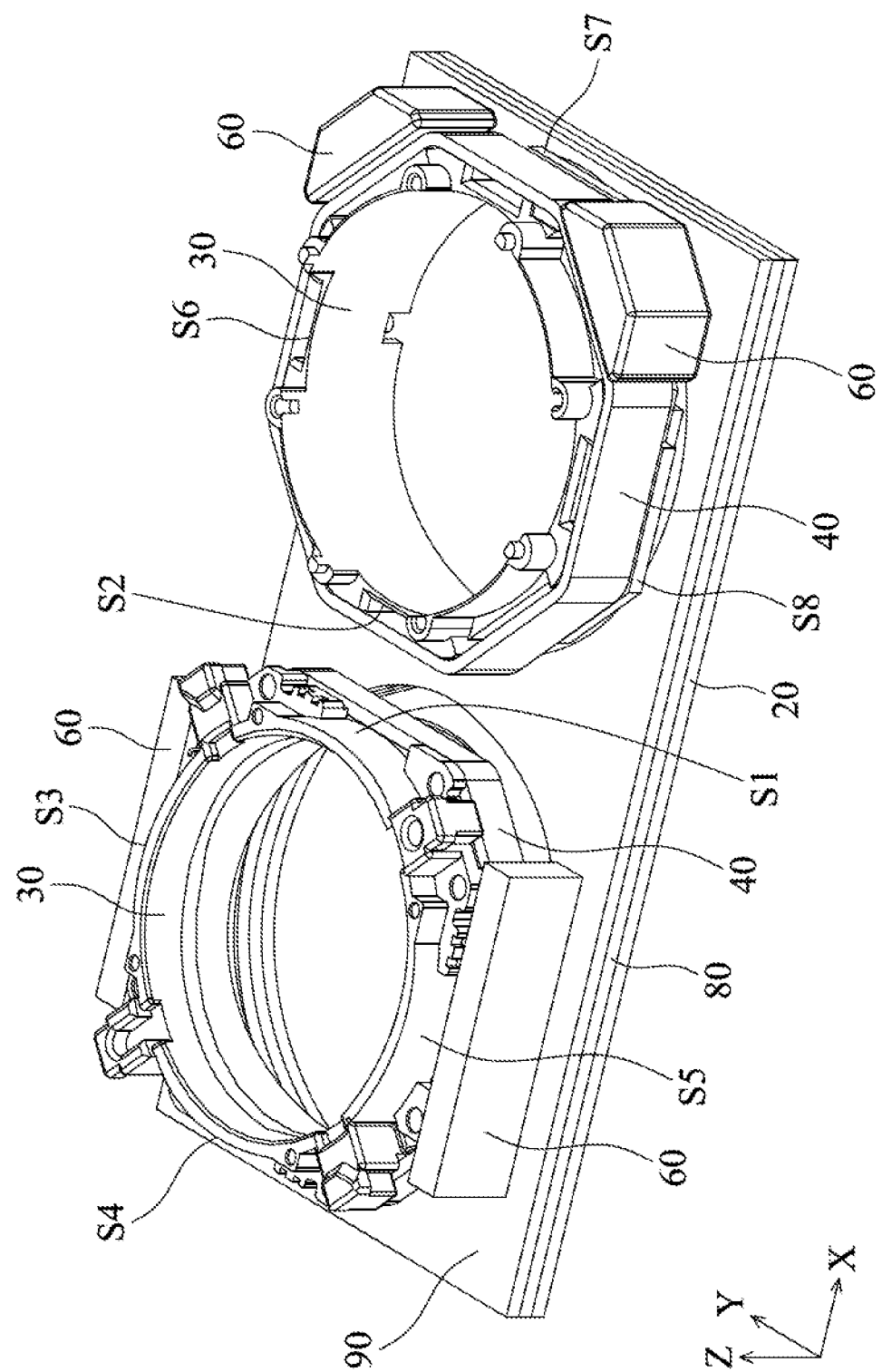

FIGS. 8A-8B are schematic views showing the configuration of the dual-lens camera system of the optical system in accordance with another embodiment of the invention. In this embodiment, the four driving magnets 60 are respectively disposed on the sides S3 and S5 of the holder 30 of the first lens driving module at the left (the first holder) and on the two corners of the second lens driving module at the right which are far from the first lens driving module at the left, wherein the driving magnets 60 disposed on the two corners are substantially perpendicular the each other. As shown by the region R in FIG. 8A, no driving magnet 60 is disposed between the side S1 of the holder 30 at the left and the center C of the holder 30 at the right along the X-axis direction.

With the above structural design shown in FIG. 8A, no magnet is disposed on the sides S1 and S2 of the holders 30 of the two lens driving modules. As a result, the magnetic interference generated by the adjacent driving magnets 60 of the two lens driving modules may be reduced. Consequently, the magnetic interference between the two lens driving modules of the dual-lens camera system is reduced. Furthermore, since no driving magnet 60 is disposed on the side S4 of the holder of the first lens driving module at the left, the length of the two lens driving modules along the direction X-axis may be reduced, and thus their volumes may be decreased.

Figure 9A:
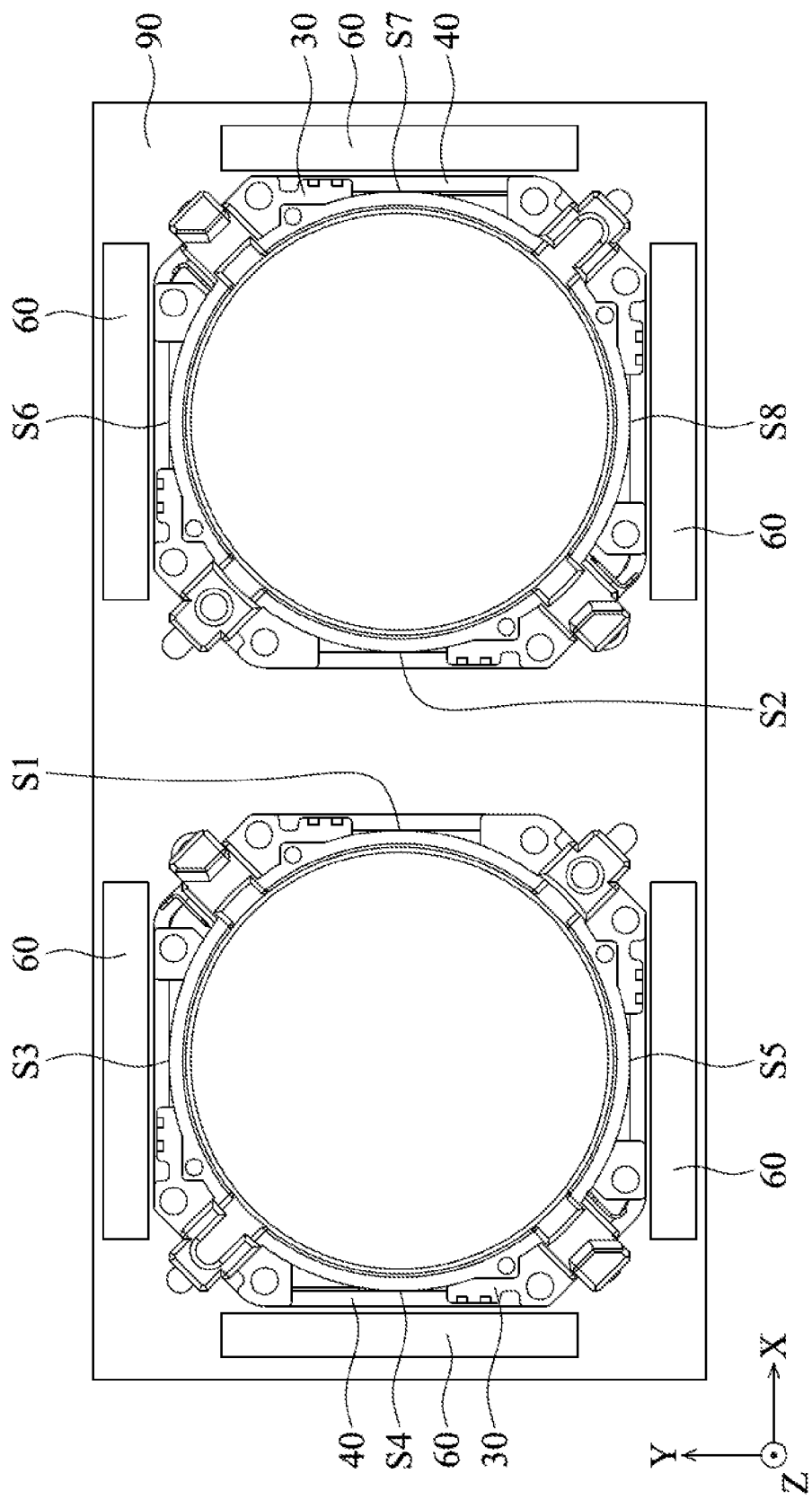
FIGS. 9A-9B are schematic views showing the configuration of the dual-lens camera system in accordance with another embodiment of the invention.
Figure 9B:
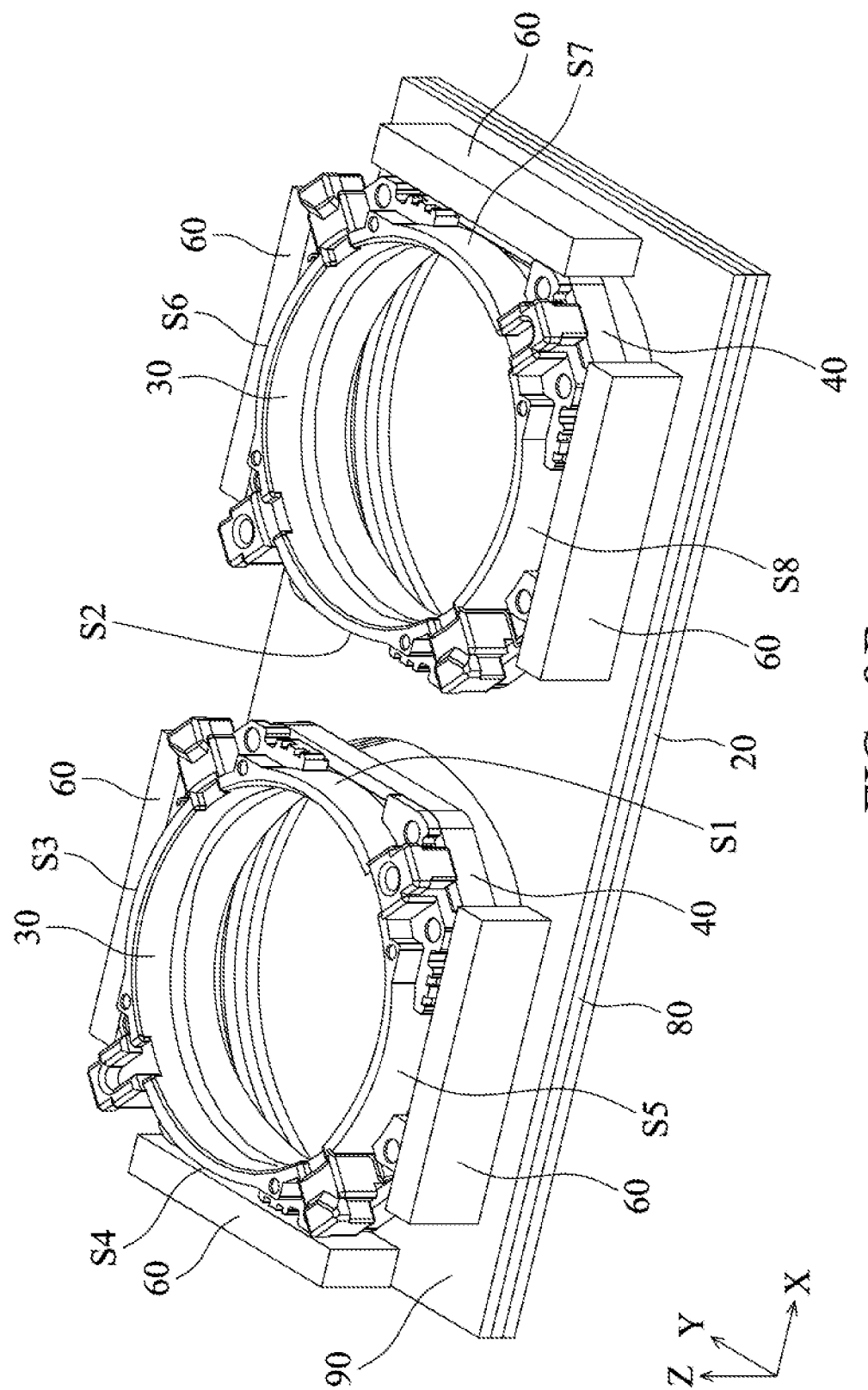

FIGS. 9A-9B are schematic views showing the configuration of the dual-lens camera system of the optical system in accordance with another embodiment of the invention. In this embodiment, the six driving magnets 60 are respectively disposed on the sides S3, S4 and S5 of the holder 30 of the first lens driving module at the left (the first holder) and on the sides S6, S7 and S8 of the holder 30 of the second lens driving module at the right (the second holder).

With the above structural design shown in FIG. 9A, no magnet is disposed on the sides S1 and S2 of the holders 30 of the two lens driving modules. As a result, the magnetic interference generated by the adjacent driving magnets 60 of the two lens driving modules can be reduced. Consequently, the magnetic interference between the two lens driving modules of the dual-lens camera system is reduced.

Figure 10A:
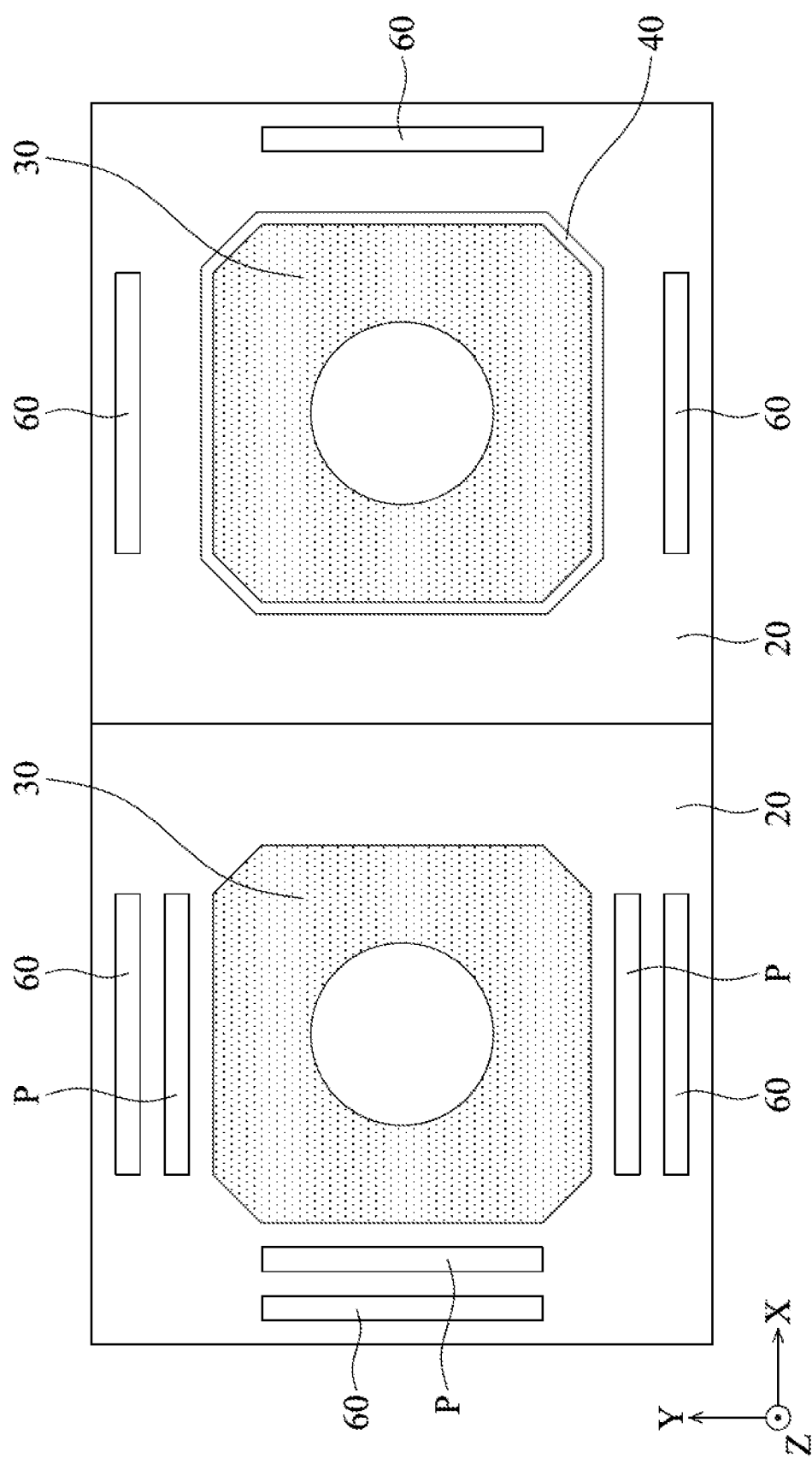
FIG. 10A is a schematic view showing the configuration of the dual-lens camera system in accordance with another embodiment of the invention.
Figure 10B:
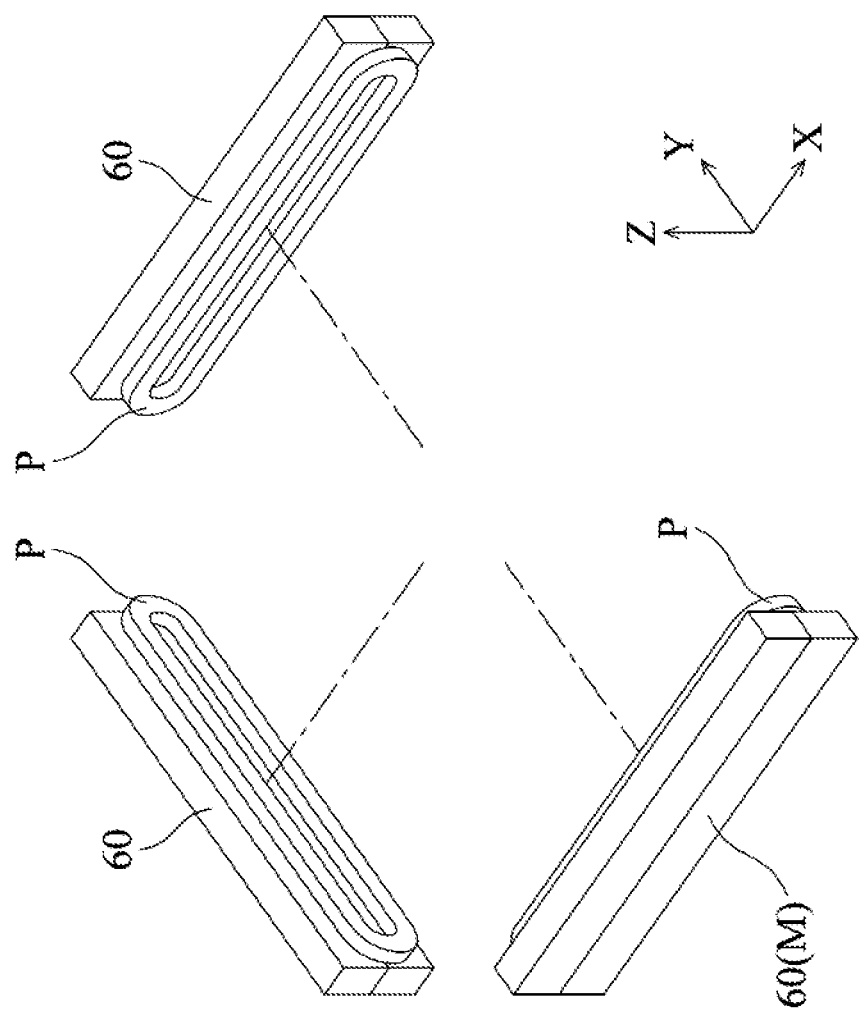
FIG. 10B is a schematic view illustrating the relative positions of the capsule-shaped driving coil P and the driving magnets 60 at the left side of FIG. 10A.
Figure 10C:
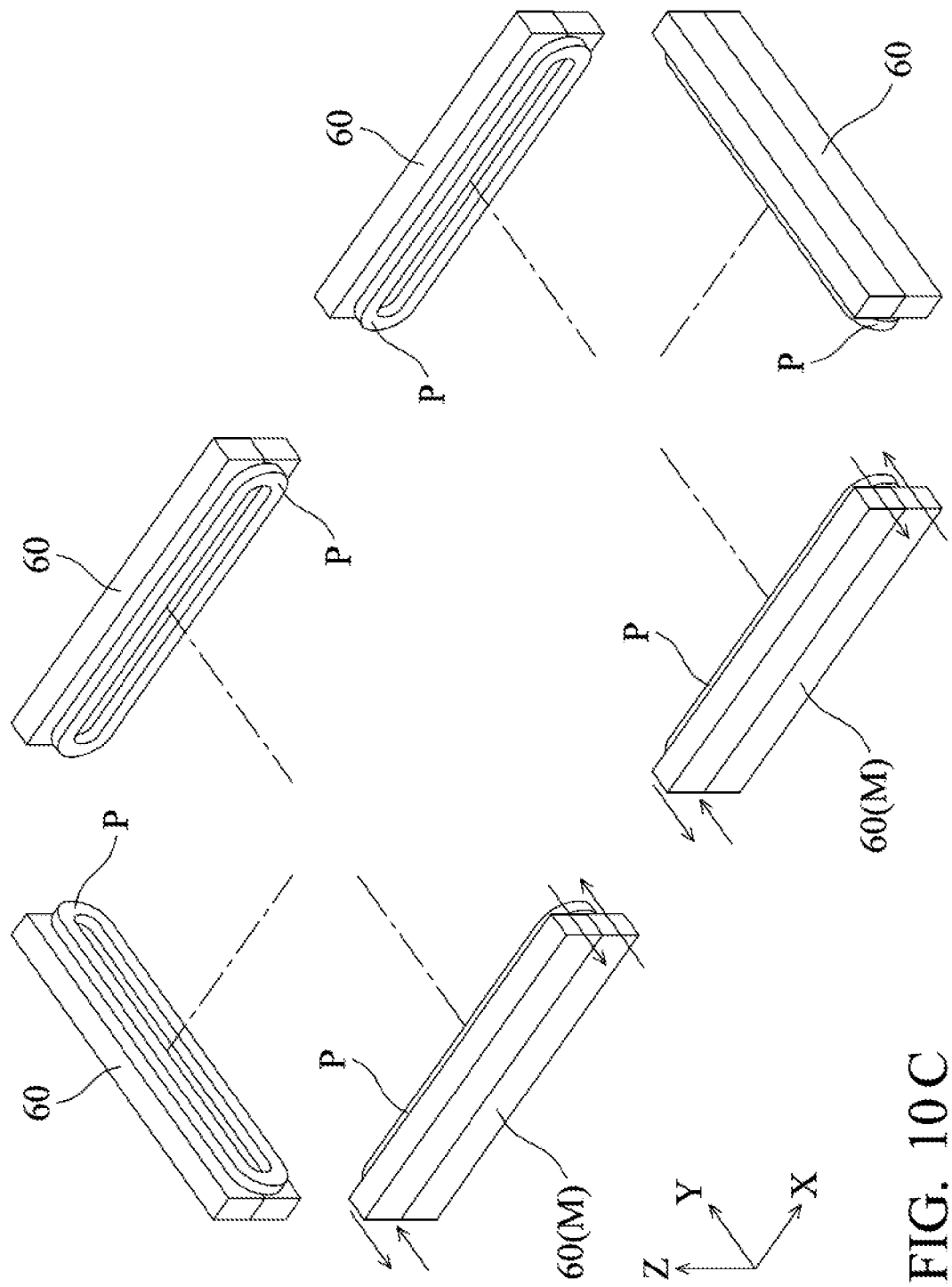
FIG. 10C is a schematic view illustrating the relative positions of the capsule-shaped driving coils P and the driving magnets 60.

FIG. 10A is a schematic view showing the configuration of the dual-lens camera system of the optical system in accordance with another embodiment of the invention. As shown in FIG. 10B, capsule-shaped driving coils P and driving magnets 60 of the first lens driving module at the left of the FIG. 10A are shown. This embodiment is different from that of FIGS. 9A and 9B, wherein the coil 40 is disposed around the holder 30 at the right side, and the capsule-shaped driving coils P are respectively disposed on the three sides of the holder 30 at the left which corresponding to the driving magnets 60. Multipolar magnets, such as 4-pole magnets, may be used as the driving magnets 60 to reduce the volume of the first driving module at the left, and thus the purpose of device miniaturization is achieved. Alternatively, the driving magnets 60 of the two lens driving modules may be multipolar magnets, as shown in FIG. 10C, wherein the directions of the magnetic poles of the multipolar magnets 60(M) (magnetizing direction, as denoted by arrows in FIG. 10C) at the same side of the optical system may be the same, such as perpendicular to the optical axis O (the Z-axis direction).

In summary, an optical system such as a duel-lens camera system comprising two lens driving modules is provided. Each of the lens driving includes at least one magnet disposed on the sides or corners of the two lens driving modules except for their adjacent sides. As a result, the distance between the magnets of the two lens driving modules may be increased. Consequently, the magnetic interference between the magnets is reduced. In one embodiment, capsule-shaped driving coils may be disposed in the lens driving modules to reduce the volume of the lens driving modules and thus the purpose of device miniaturization is achieved.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
   a base;
   a first driving module, comprising:
   a first holder configured to receive a first optical element and having a first side;
   at least one first magnet disposed in the first holder;
   a first coil adjacent to the first magnet, wherein a magnetic force is generated between the first coil and the first magnet to move the first holder and the first optical element relative to the base; and
   a second driving module, comprising:
   a second holder configured to receive a second optical element and having a second side;
   at least one second magnet disposed in the second holder;
   a second coil adjacent to the second magnet, wherein a magnetic force is generated between the second coil and the second magnet to move the second holder and the second optical element relative to the base,
   wherein the first side is adjacent to the second side, and no magnet is disposed on the first side or the second side.

2. The optical system as claimed in claim 1, wherein the first side and the second side are parallel to each other.

3. The optical system as claimed in claim 1, wherein the number of the at least one first magnet is two, and the first holder further comprises a third side, a fourth side and a fifth side, wherein the two first magnets are respectively disposed on the third and fourth sides, and the third side is perpendicular to the fourth side, and wherein the fourth side is between the third and fifth sides.

4. The optical system as claimed in claim 3, wherein the number of the at least one second magnet is two, and the second holder further comprises a sixth side, a seventh side and an eighth side, wherein the two second magnets are respectively disposed on the sixth and seventh sides, and the sixth side is perpendicular to the seventh side, and wherein the seventh side is between the sixth and eighth sides.

5. The optical system as claimed in claim 1, wherein the number of the at least one first magnet is two, and the first holder further comprises a third side, a fourth side and a fifth side, wherein the two first magnets are respectively disposed on the third and fifth sides, and the third side is parallel to the fifth side, and wherein the fourth side is between the third and fifth sides.

6. The optical system as claimed in claim 5, wherein the number of the at least one second magnet is two, and the second holder further comprises a sixth side, a seventh side and an eighth side, wherein the two second magnets are respectively disposed on the sixth and eighth sides, and the sixth side is parallel to the eighth side, and wherein the seventh side is between the sixth and eighth sides.

7. The optical system as claimed in claim 1, wherein the number of the least one first magnet is three, and the first holder further comprises a third side, a fourth side and a fifth side, wherein the three first magnets are respectively disposed on the third, fourth and fifth sides, and the third side is perpendicular to the fourth side, and wherein the fourth side is between the third and fifth sides.

8. The optical system as claimed in claim 7, wherein the number of the at least one second magnet is three, and the second holder further comprises a sixth side, a seventh side and an eighth side, wherein the three second magnets are respectively disposed on the sixth, seventh and eighth sides, and the seventh side is between the sixth and eighth sides.

9. The optical system as claimed in claim 1, further comprising a driving board, wherein the first coil and the second coil are disposed on the driving board, a magnetic force is generated between the first coil and the first magnet to move the first holder along a direction perpendicular to an optical axis of the first optical element, and a magnetic force is generated between the second coil and the second magnet to move the second holder along a direction perpendicular to an optical axis of the second optical element.

10. The optical system as claimed in claim 1, wherein the first coil is disposed on the first holder, and the second coil is disposed on the second holder, wherein a magnetic force is generated between the first coil and the first magnet to move the first holder along a direction parallel to an optical axis of the first optical element, and a magnetic force is generated between the second coil and the second magnet to move the second holder along a direction parallel to an optical axis of the second optical element.

11. An optical system, comprising:
    a base;
    a first driving module, comprising:
    a first holder configured to receive a first optical element and having a first side;
    at least one first magnet disposed in the first holder;
    a first coil adjacent to the first magnet, wherein a magnetic force is generated between the first coil and the first magnet to move the first holder and the first optical element relative to the base; and
    a second driving module, comprising:
    a second holder configured to receive a second optical element and having a second side;

at least one second magnet disposed in the second holder;
a second coil adjacent to the second magnet, wherein a magnetic force is generated between the second coil and the second magnet to move the second holder and the second optical element relative to the base,
wherein the first side is adjacent to the second side, a first distance is formed between the first magnet and the second magnet, and a second distance is formed between the first side and the second side, wherein the first distance is greater than the second distance.

12. The optical system as claimed in claim 11, wherein the first side and the second side are parallel to each other.

13. The optical system as claimed in claim 11, wherein the number of the at least one first magnet is two, and the first holder further comprises a third side, a fourth side and a fifth side, wherein the two first magnets are respectively disposed on the third and fourth sides, and the third side is perpendicular to the fourth side, and wherein the fourth side is between the third and fifth sides.

14. The optical system as claimed in claim 13, wherein the number of the at least one second magnet is two, and the second holder further comprises a sixth side, a seventh side and an eighth side, wherein the two second magnets are respectively disposed on the sixth and seventh sides, and the sixth side is perpendicular to the seventh side, and wherein the seventh side is between the sixth and eighth sides.

15. The optical system as claimed in claim 11, the number of the at least one first magnet is two, and the first holder further comprises a third side, a fourth side and a fifth side, wherein the two first magnets are respectively disposed on the third and fifth sides, and the third side is parallel to the fifth side, and wherein the fourth side is between the third and fifth sides.

16. The optical system as claimed in claim 15, wherein the number of the at least one second magnet is two, and the second holder further comprises a sixth side, a seventh side and an eighth side, wherein the two second magnets are respectively disposed on the sixth and eighth sides, and the sixth side is parallel to the eighth side, and wherein the seventh side is between the sixth and eighth sides.

17. The optical system as claimed in claim 11, wherein the number of the least one first magnet is three, and the first holder further comprises a third side, a fourth side and a fifth side, wherein the three first magnets are respectively disposed on the third, fourth and fifth sides, and the third side is perpendicular to the fourth side, and wherein the fourth side is between the third and fifth sides.

18. The optical system as claimed in claim 17, wherein the number of the at least one second magnet is three, and the second holder further comprises a sixth side, a seventh side and an eighth side, wherein the three second magnets are respectively disposed on the sixth, seventh and eighth sides, and the seventh side is between the sixth and eighth sides.

19. The optical system as claimed in claim 11, further comprising a driving board, wherein the first coil and the second coil are disposed on the driving board, a magnetic force is generated between the first coil and the first magnet to move the first holder along a direction perpendicular to an optical axis of the first optical element, and a magnetic force is generated between the second coil and the second magnet to move the second holder along a direction perpendicular to an optical axis of the second optical element.

20. The optical system as claimed in claim 11, wherein the first coil is disposed on the first holder, and the second coil is disposed on the second holder, wherein a magnetic force is generated between the first coil and the first magnet to move the first holder along a direction parallel to an optical axis of the first optical element, and a magnetic force is generated between the second coil and the second magnet to move the second holder along a direction parallel to an optical axis of the second optical element.

* * * * *